United States Patent
Hulsey

(10) Patent No.: US 10,604,960 B1
(45) Date of Patent: Mar. 31, 2020

(54) PORTABLE GROUND BLIND AND SYSTEM FOR TRANSPORTATION AND DEPLOYMENT THEREOF

(71) Applicant: Ethan Hulsey, Fate, TX (US)

(72) Inventor: Ethan Hulsey, Fate, TX (US)

(*) Notice: Subject to any disclaimer, the term of this patent is extended or adjusted under 35 U.S.C. 154(b) by 0 days.

(21) Appl. No.: 16/505,932

(22) Filed: Jul. 9, 2019

(51) Int. Cl.
| E04H 15/02 | (2006.01) |
| E04H 15/00 | (2006.01) |
| E04H 15/54 | (2006.01) |

(52) U.S. Cl.
CPC .......... E04H 15/001 (2013.01); E04H 15/02 (2013.01); E04H 15/54 (2013.01)

(58) Field of Classification Search
CPC .......................... E04H 15/001; A01M 31/025
See application file for complete search history.

(56) References Cited

U.S. PATENT DOCUMENTS

| 2,771,088 | A | * | 11/1956 | Soldan | ................. E04H 15/003 135/87 |
| 3,537,688 | A | * | 11/1970 | Stein | ................. E04H 15/003 135/95 |
| 4,599,754 | A | * | 7/1986 | Mairs, III | ................. A47G 9/06 135/96 |
| 4,685,484 | A | * | 8/1987 | Moneta | ................. E04H 15/003 135/117 |
| 4,860,777 | A | * | 8/1989 | Orlando | ................. E04H 15/003 135/87 |
| 4,969,500 | A | * | 11/1990 | Makosa | ................. E04H 15/003 135/902 |
| 5,062,234 | A | | 11/1991 | Green | |
| 5,609,176 | A | | 3/1997 | Weeks | |
| 5,730,529 | A | * | 3/1998 | Fritz | ........................ A45C 3/10 224/153 |
| 6,145,528 | A | | 11/2000 | Egnew | |
| 7,766,022 | B2 | | 8/2010 | Livacich | |
| 7,770,573 | B2 | | 8/2010 | Haugen | |
| 7,958,904 | B2 | * | 6/2011 | Lau | ..................... A01M 31/025 135/147 |
| D745,979 | S | | 12/2015 | Wyant | |
| 9,435,133 | B2 | * | 9/2016 | Bourland | ................. E04H 15/02 |
| 2004/0123386 | A1 | * | 7/2004 | Higashi | .................... A45C 3/10 5/420 |
| 2013/0219768 | A1 | | 8/2013 | Hand | |

* cited by examiner

*Primary Examiner* — Noah Chandler Hawk
(74) *Attorney, Agent, or Firm* — Zachary W. Hilton

(57) ABSTRACT

A portable ground blind having a plurality of pole-supported dual-mesh panels with openings formed along bottom sides of one or more of said panels, providing optimized concealment for the user, while also enhancing the user's ability to see and engage potential targets at multiple locations around the user. The dual-mesh panels include an outer mesh webbing and an inner mesh webbing, the outer mesh webbing having mesh openings of larger size than the mesh openings of the inner mesh webbing. Ghillie threads and/or other concealment enhancement objects are attachable on the outer mesh webbing, increasing the overall concealment of the user and allowing the user to customize the nature of concealment of the portable ground blind.

12 Claims, 13 Drawing Sheets

US 10,604,960 B1

PORTABLE GROUND BLIND AND SYSTEM FOR TRANSPORTATION AND DEPLOYMENT THEREOF

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Technical Field

The present invention relates generally to ground blinds and, more specifically, to a portable ground blind having a plurality of pole-supported dual-mesh panels with openings formed along bottom sides of one or more of said panels, providing optimized concealment for the user, while also enhancing the user's ability to see and engage potential targets at multiple locations around the user.

Description of Related Art

Various objects, both natural and man-made, have been used in the past by people seeking to conceal themselves on the ground in connection with hunting, combat, or wildlife observation activities. Indeed, free-standing or anchored ground blinds are known in the art, and typically involve the use of a concealment fabric supported by a support structure that is intended to either completely or partially surround the user seeking to be concealed. However, such prior art ground blinds suffer from various drawbacks, especially for users that intend to use a ground blind while in a prone position. In fact, most prior art ground blinds are intended for use by a user that is sitting in a chair or other structure off of the ground, with any openings in the blind being positioned some distance from the ground such that a user lying in the prone position would not be able to easily access such openings without inconveniently rising out of such position. Further, most prior art ground blinds are not designed to facilitate the user's ability to see through the concealment fabric, as it is intended that the user view out of the ground blind through the elevated openings positioned several feet from the bottom of the blind.

Another drawback of prior art ground blinds is that they lack any structures on which a user may attach concealment enhancement objects onto the outer surface of the blind. This lack of structures on which to attach concealment enhancement objects onto the ground blind severely limits the amount of concealment a ground blind can provide, and does not allow a user to customize the ground blind with other types of concealment objects. Another further drawback of prior art ground blinds is that they have limited means for anchoring the ground blind into the ground, making such blinds susceptible to collapse or otherwise moving during use, especially if subjected to high wind conditions.

Other drawbacks of prior art ground blinds include their reduced ability to be compactly stored and transported, and increased difficulty in deploying such prior art ground blinds. In many cases, prior art ground blinds involve complicated support mechanisms which may pose difficulties for a user in deploying the ground blind in the dark and/or deploying the ground blind quickly. Such complicated prior art ground blind designs also contribute to the added weight of the blinds, making it more challenging for a user to transport the blinds across long distances.

Therefore, what is needed is a portable ground blind having one or more openings positioned at ground level. What is also needed is portable ground blind with two or more mesh structures, providing for enhanced concealment, while also providing a user with increased outward visibility, and the ability to attach concealment enhancement objects to an outer surface of the blind's mesh structure. What is also needed is portable ground blind that may be conveniently and quickly deployed and anchored on ground in various conditions. What is also needed is a portable ground blind deployment and transportation system that provides for convenient transportation and deployment of a portable ground blind. The portable ground blind and portable ground blind transportation and deployment system described herein satisfy these needs and others as will become apparent to one of ordinary skill after a careful study of the detailed description of the embodiments set forth below.

BRIEF DESCRIPTION OF THE SEVERAL VIEWS OF THE DRAWINGS

The present invention will be more fully understood by reference to the following detailed description of the preferred embodiments of the present invention when read in conjunction with the accompanying drawings, wherein.

Figure 1:
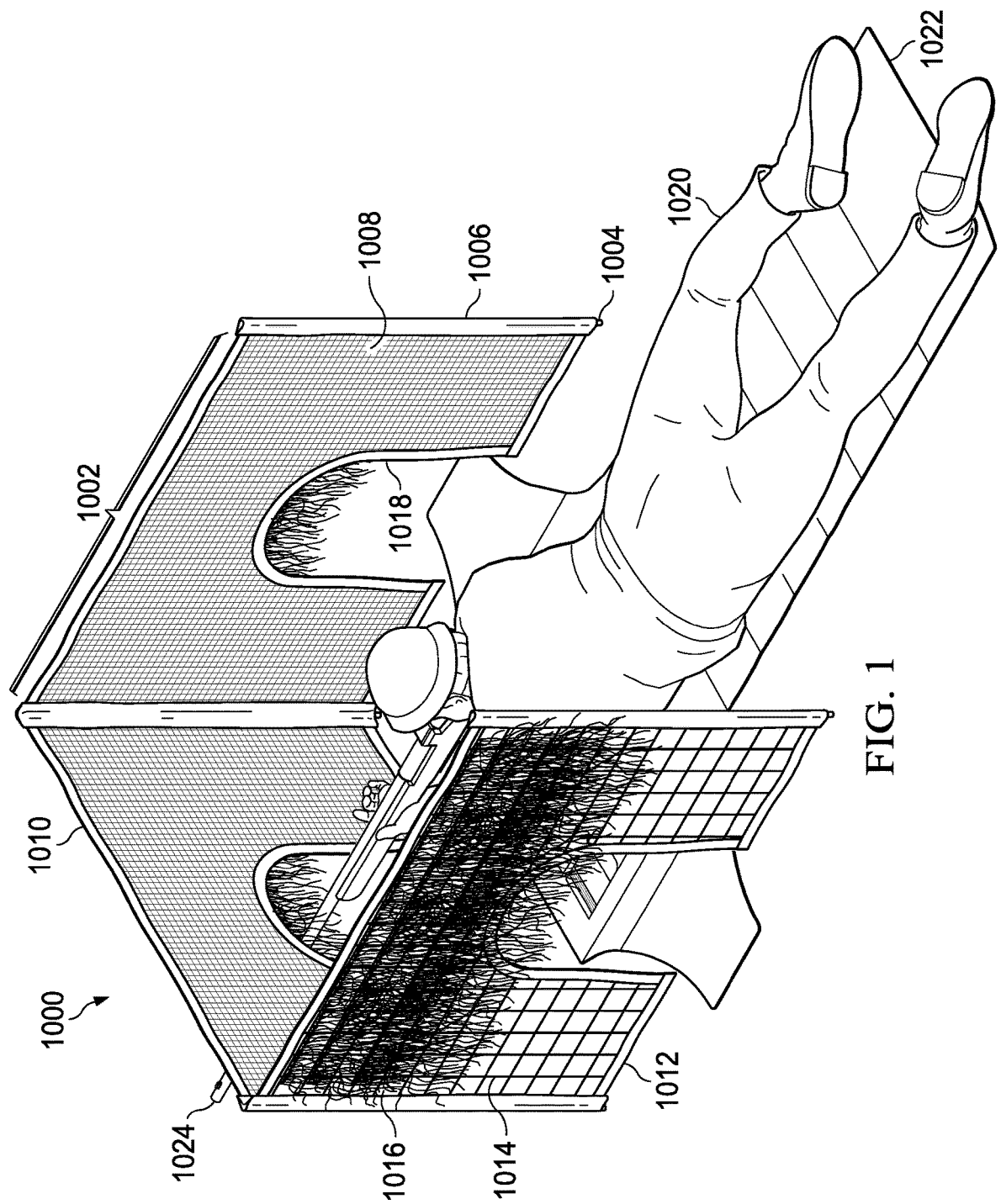
FIG. 1 is a perspective view of an embodiment of a portable ground blind that has been deployed by, and is in use by, a user lying in a prone position on an embodiment of a shooting mat.

The above figures are provided for the purpose of illustration and description only, and are not intended to define the limits of the disclosed inventions. Use of the same reference number in multiple figures is intended to designate the same or similar parts. Furthermore, if and when the terms "top," "bottom," "anterior," "posterior," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

DETAILED DESCRIPTION OF THE INVENTION

Several exemplary embodiments of the claimed invention(s) will now be described with reference to the drawings. Unless otherwise noted, like elements will be identified by identical numbers throughout all figures. The invention(s) illustratively disclosed herein suitably may be practiced in the absence of any element that is not specifically disclosed herein.

Portable ground blinds having a plurality of pole-supported dual-mesh panels with openings formed along bottom sides of one or more of said panels, providing optimized concealment for the user, while also enhancing the user's ability to see and engage potential targets at multiple locations around the user, are disclosed herein. It should be noted that while the exemplary embodiments described herein are associated with portable ground blinds for hunting and other activities involving firearms, the portable ground blinds taught herein could also be equally utilized in connection with other types of activities that require user concealment such as, for example, animal viewing and photography, and paintball sporting activities.

Referring now to FIG. 1, a perspective view of an embodiment of a portable ground blind (1000) that has been deployed by, and is in use, by a user (1020) lying in a prone position on an embodiment of a shooting mat (1022) is shown. In one embodiment of the portable ground blind, as depicted in FIG. 1, a plurality of connected blind panels (1002) are configured to conceal a user (1020) on various sides of said user as he/she lies in a prone shooting position on the ground. Each blind panel (1002) includes at least two poles (1004) or other elongated structures that work to support a mesh system. Each blind panel adjoins another blind panel at a hollow sleeve (1006) enclosing a pole such that in at least one embodiment, a single pole or other elongated structure may support two blind panels. When the ground blind is deployed, the poles (1004) are oriented in a substantially vertical manner and are enclosed within a hollow sleeve (1006) that runs along the length of each pole. Each pole or other elongated structure utilized to support the blind panels have a top end and a bottom end. In one embodiment of the ground blind as depicted in FIG. 1, the bottom end of each pole, as well as a length of a bottom portion of said poles, is not enclosed within a sleeve (protrudes from an opening in the bottom of the hollow sleeve in which it is enclosed), and such non-enclosed portion of the poles is configured for insertion into the ground, which works to anchor the ground blind into the ground in a substantially vertical orientation as is illustrated in FIG. 1. In one embodiment, the poles (1004) are constructed of steel. However, it is contemplated that in other embodiments, the poles or other elongate support structures utilized to support the ground blind panels may be constructed of other materials such as, for example, aluminum, titanium, carbon fiber, and other polymer or metal alloys. In embodiments of the ground blind, the poles or other elongate structures may be solid or hollow, or have portions of the poles that are hollow and other portions of the poles that are solid. For example, in one alternate embodiment, a bottom portion of the poles may be solid to allow for insertion into the ground, while the remainder of the upper pole portions may be hollow to allow for weight reduction.

Still referring to FIG. 1, the sleeve (1006) is in one embodiment constructed of a ballistics nylon material (although other materials may be used) and is elongate in shape to accommodate an enclosed pole that runs along a hollow interior of said sleeve. In one embodiment, a top end of each sleeve is closed, while a bottom end of each sleeve is open such that an exposed bottom portion of each pole may protrude from the sleeve opening (this bottom portion of the pole is configured to be inserted into the ground when the ground blind is deployed). In one embodiment of the portable ground blind, the poles may be completely removed from the sleeves when the blind is not being deployed to allow for more efficient transportation, storage, and/or cleaning of the portable ground blind. In one embodiment, the height of a ground blind panel may be approximately 1.5 meters, and the length of the ground blind panel may be approximately 1.5 meters. However, it should be noted that in alternate embodiments of the portable ground blind, the blind panels may be constructed to have various dimensions, depending on factors such as the size of the user, how many users intend to use the ground blind, and how compact and/or light the ground blind needs to be for transporting the ground blind.

Still referring to FIG. 1, one or more mesh structures span the area of each blind panel between the poles/sleeves. The portable ground blind panels (1002) have a mesh structure such that each mesh structure has a top side (1010), bottom side (1012), and two lateral sides (attached to the sleeves (1006)). The mesh structures are configured to conceal the user from the view of people or wildlife outside of the ground blind, while allowing the user of the ground blind to see such people or wildlife. In one embodiment of the ground blind, as depicted in FIG. 1, a dual-mesh structure is utilized, comprising an inner high-density mesh webbing (1008) and an outer low-density mesh webbing (1014) having concealment enhancement objects (1016) attached thereto. In some alternate embodiments of the ground blind, less than two meshes or more than two meshes may comprise the mesh structure. The substantially vertical sides (when deployed) of both of the inner high-density mesh webbing (1008) and the outer low-density mesh webbing (1014) are attached (in one embodiment, sewn) to the sleeves (1006) that form the sides of each blind panel (1002). At the top side (1010) and bottom side (1012) of each mesh structure forming the blind panel (1002), the mesh structures (1008, 1014) are attached (in one embodiment, sewn) to a ballistics nylon liner, which works to join such mesh structures together and also to prevent fraying of the ends of the mesh.

Still referring to FIG. 1, an opening (1018) is formed in the mesh structure (opening formed in both of the inner high-density mesh webbing (1008) and the outer low-density mesh webbing (1014)) on the bottom side of each blind panel (1002) such that the bottom side (1012) of the mesh structure is not linear along its length, and appears similar to a mouse hole having a semi-circle arch at the top of the opening. The panel openings provide a user lying in a prone position with the ability to view outside of the portable ground blind in a multitude of directions, and to allow for the protrusion of a firearm barrel (1024) through such panel openings. While the panel openings (1018) of the embodiment of the portable ground blind (1000) depicted in FIG. 1 are arch-shaped and are formed in every blind panel, it is contemplated that in alternate embodiments of the portable ground blind, the panel openings may have different shapes, may have the ability to open and close (see FIGS. 7-8) via a slit and flaps, and an opening may not be formed in every blind panel of a portable ground blind. In one embodiment of the portable ground blind, as depicted in FIG. 1, edges of the panel openings are lined with a ballistics nylon, which works to join the mesh structures together and also to prevent fraying of the ends of the mesh at the panel opening. While the panel openings of the portable ground blind appearing in FIG. 1 are approximately 0.5 meters wide at the bottom and approximately 0.5 meters in height at the top of the arch, alternate embodiments of the ground blind may have panel openings of other various dimensions and shapes that may be chosen on the basis of factors such as the preference of the intended user and the type of application for which the portable ground blind will be used.

Figure 2:
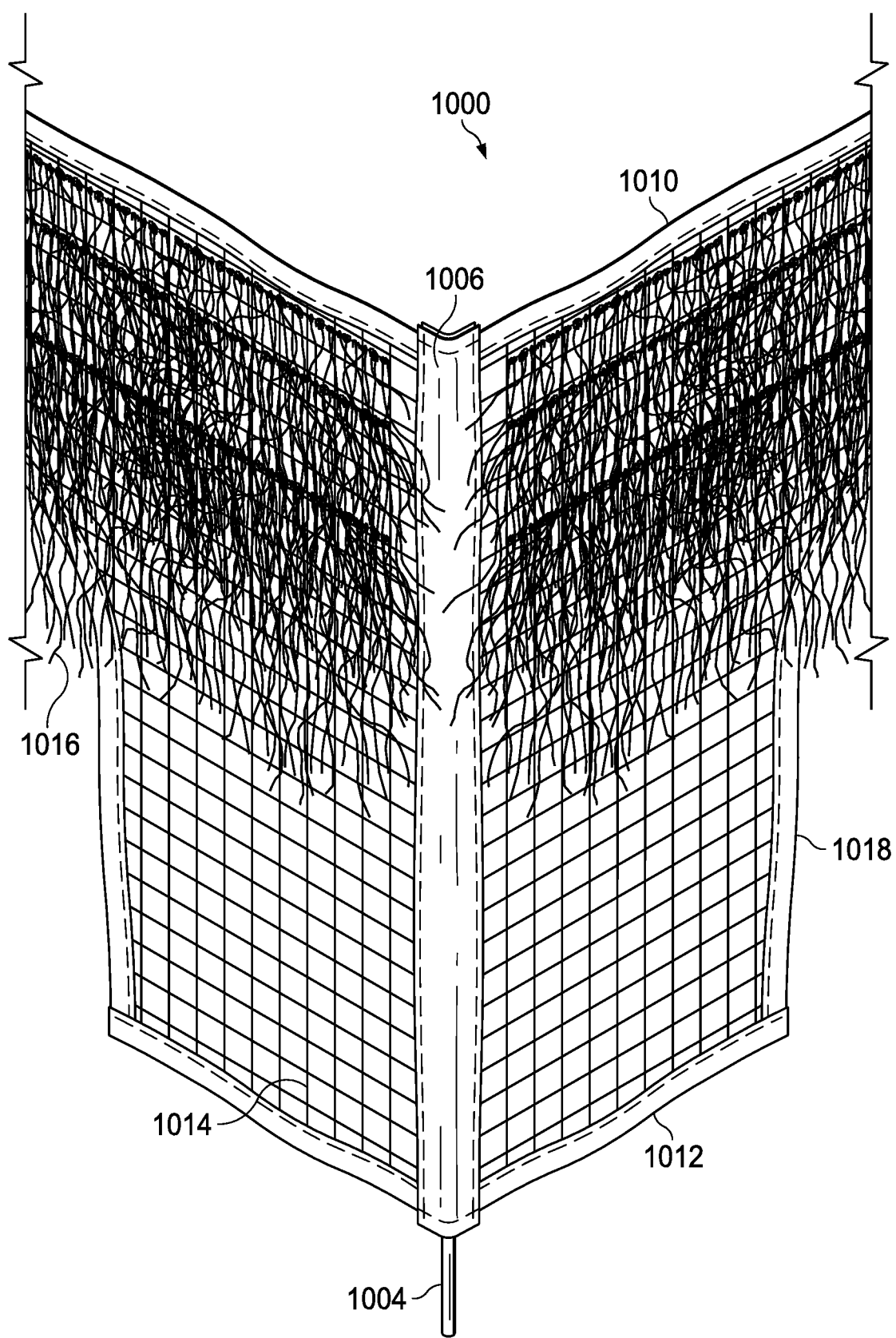
FIG. 2 is a partial front view of the embodiment of the portable ground blind depicted in FIG. 1.

Referring now to FIG. 2, a partial front view of the embodiment of the portable ground blind (1000) depicted in FIG. 1 is shown. The outer low-density mesh webbing (1014) is constructed of a mesh webbing that has larger mesh openings as compared to the inner high-density mesh webbing (1008). In one embodiment, the outer low-density mesh webbing (1014) is constructed of nylon threads with substantially square-shaped mesh openings with sides of approximately 3.8 centimeters by 3.8 centimeters (roughly 1.5 inch sides) (although, like the inner mesh, it is contemplated that the outer mesh may be constructed with other materials and the mesh openings may have other various dimensions). In one embodiment, the outer low-density mesh webbing (1014) serves as a structure for the attachment of a plurality of concealment enhancement objects such as, for example, "ghillie" threads (1016). Ghillie threads are mono-color or multi-color threads made of cotton or other materials that are typically attached to clothing and other objects to conceal a user or thing as the threads appear to be plants and break up the visual outline of the person or thing. Ghillie threads (1016) or other concealment enhancement objects (for example, leaves or artificial leaves) may be attached (for example, tied with threads, attached with adhesives, attached with magnets to metal attached to the outer mesh, or if the outer mesh is constructed partially or wholly of a ferrous material) to the outer low-density mesh webbing (1014) to provide the portable ground blind with even greater concealment properties than are provided by the mesh structures alone. This concealment enhancing property of the portable ground blind provides another advantage not seen in prior art ground blinds in that it allows a user to enhance the concealing nature of the ground blind, and also the ability to customize the placement of such further concealment enhancement objects. While the bottom end of the pole depicted in FIG. 2 is flat, poles of alternate embodiments of the portable ground blind may be sharpened to various degrees to facilitate insertion of the pole into the ground. In other alternate embodiments of the portable ground blind, the bottom portion of the poles may have a corkscrew shape to allow the poles to be screwed into the ground and to better anchor the poles into the ground. In such alternate embodiments, an opening at the top of the sleeve may be provided (for example, see flap 6006 at FIG. 6) to allow the user access to the top end of the pole, which may be textured or shaped (top end of poles may have flattened handle portion useful for turning by a user) to provide the user with the ability to more easily turn the pole for insertion and removal of the pole with a corkscrew shaped bottom portion.

Still referring to FIG. 2, an exposed bottom portion of a pole (1004) is shown protruding from an open bottom end of a sleeve (1006). The bottom end of the pole (1004) and adjacent exposed length of the pole is configured to be inserted into the ground to anchor the portable ground blind during deployment of use. While in one embodiment, the length of the exposed bottom portion of the poles is approximately 0.1 meters, it is contemplated that the exposed portion of the poles may be constructed to have other various lengths, depending on such factors as the condition of the ground in which the pole is to be inserted (for example, whether muddy or dry ground), the height of the blind panels to be supported by the poles, and whether the ground blind is likely to be exposed to high wind conditions.

Figure 3:
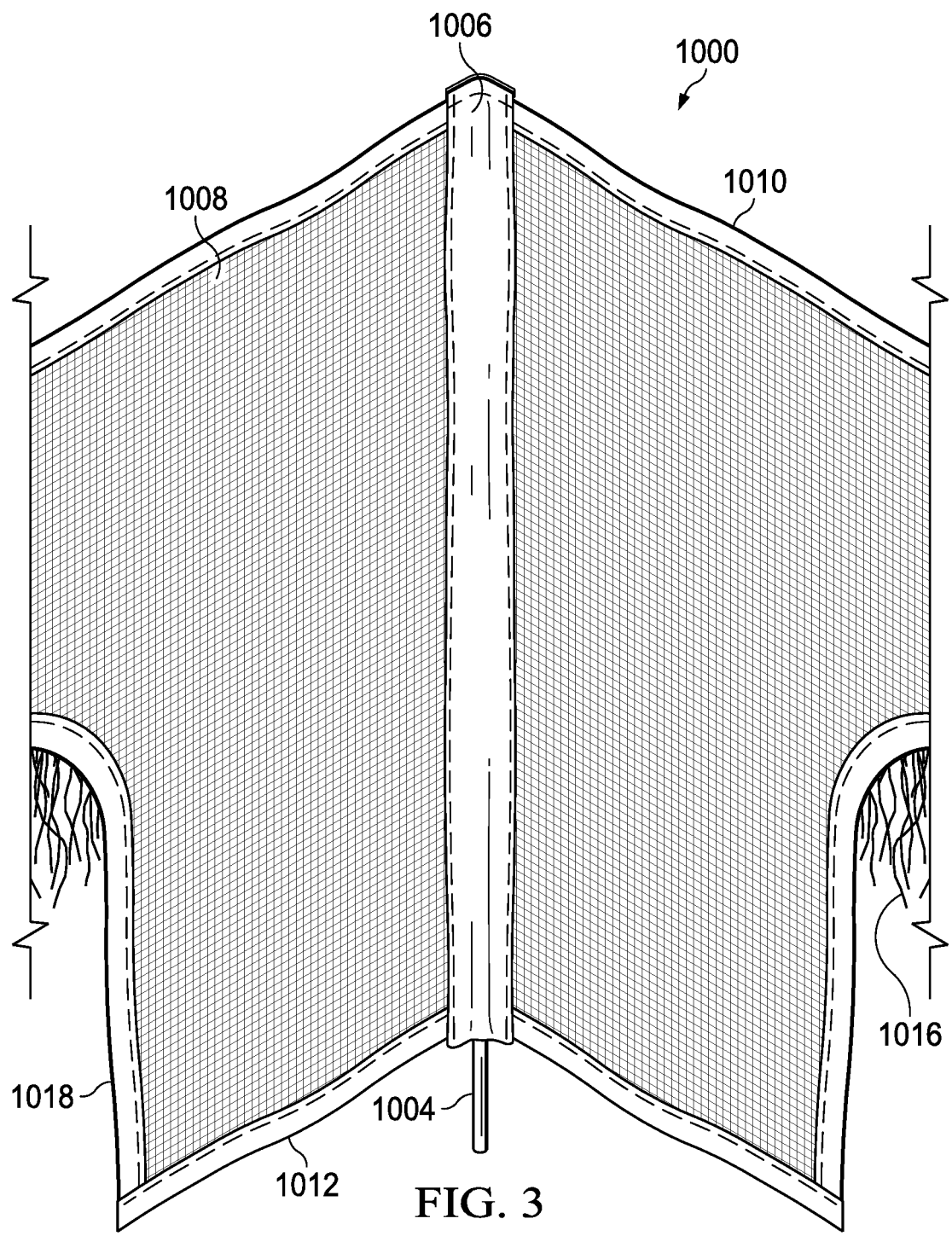
FIG. 3 is a partial rear view of the embodiment of the portable ground blind depicted in FIG. 1.

Referring now to FIG. 3, a partial rear view of the embodiment of the portable ground blind depicted in FIG. 1 is shown. In one embodiment, the inner high-density mesh webbing (1008) is constructed of a cotton fiber webbing and has substantially square shaped mesh holes of with dimensions of approximately 0.6 centimeters by approximately 0.6 centimeters. The higher density of the mesh webbing of the inner high-density mesh webbing (1008) provides for enhanced concealment of the user, but when the user's eyes are in close proximity to the mesh openings, allow for viewing of potential targets through the mesh openings. In embodiments of the portable ground blind, it is contemplated that the dimensions of the mesh openings of the inner high-density mesh webbing (1008) may be varied depending on factors such as the personal preference of the user and also the desired weight of the portable ground blind. While the inner high-density mesh webbing (1008) is in one embodiment constructed of cotton fabric, the inner high-density mesh webbing may in other alternate embodiments be constructed of other materials such as nylon, hemp, etc.

Figure 4:
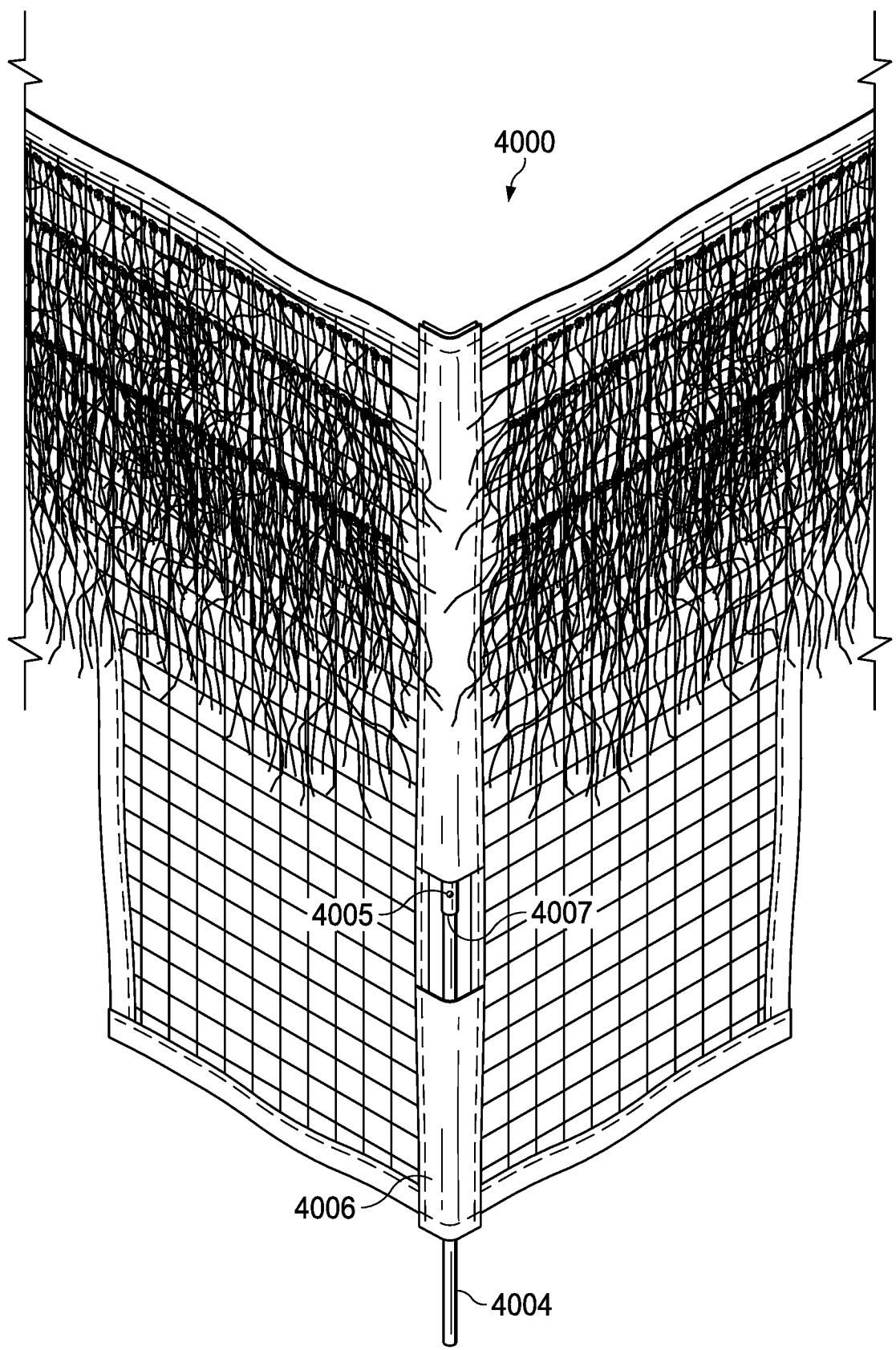
FIG. 4 is a partial front view of an alternate embodiment of the portable ground blind having telescoping collapsible support poles.

Referring now to FIG. 4, a partial front view of an alternate embodiment of the portable ground blind (4000) having telescoping collapsible support poles (4004) is shown. In one embodiment, the pole comprises an upper portion and a lower portion, the upper portion of the pole having an opening (4007) and a larger diameter than the lower portion of the pole to allow the lower portion to fit within the hollow interior of the upper portion of the pole when collapsed. A spring-loaded detent button (4005) or "button clip" formed on the lower portion of the pole may be configured to engage a hole formed on the upper portion of the pole, allowing the two pole portions to lock into place when the lower portion is fully extended, and unlock when the user seeks to collapse the pole. In the embodiment of the alternate portable ground blind illustrated at FIG. 4, an outer portion of the sleeve (4006) has been removed to facilitate a user's access to the spring-loaded detent button (4005) and to allow a user to more easily slide the lower portion of the pole into the upper portion of the pole. It is contemplated that in alternate embodiments of the portable ground blind that alternate mechanisms of providing for the collapse of the poles or other elongate support structures may be utilized such as for example, twist lock compression ring clamps, lever clamps, and elastic cords connecting poles of different sizes. While the collapsible pole depicted in FIG. 4, comprises two portions, other alternate embodiments of the pole may comprise additional portions (requiring additional mechanisms for securing the pole portion junctions), allowing the poles to be collapsed to an even more compact length for transportation and storage.

Figure 5:
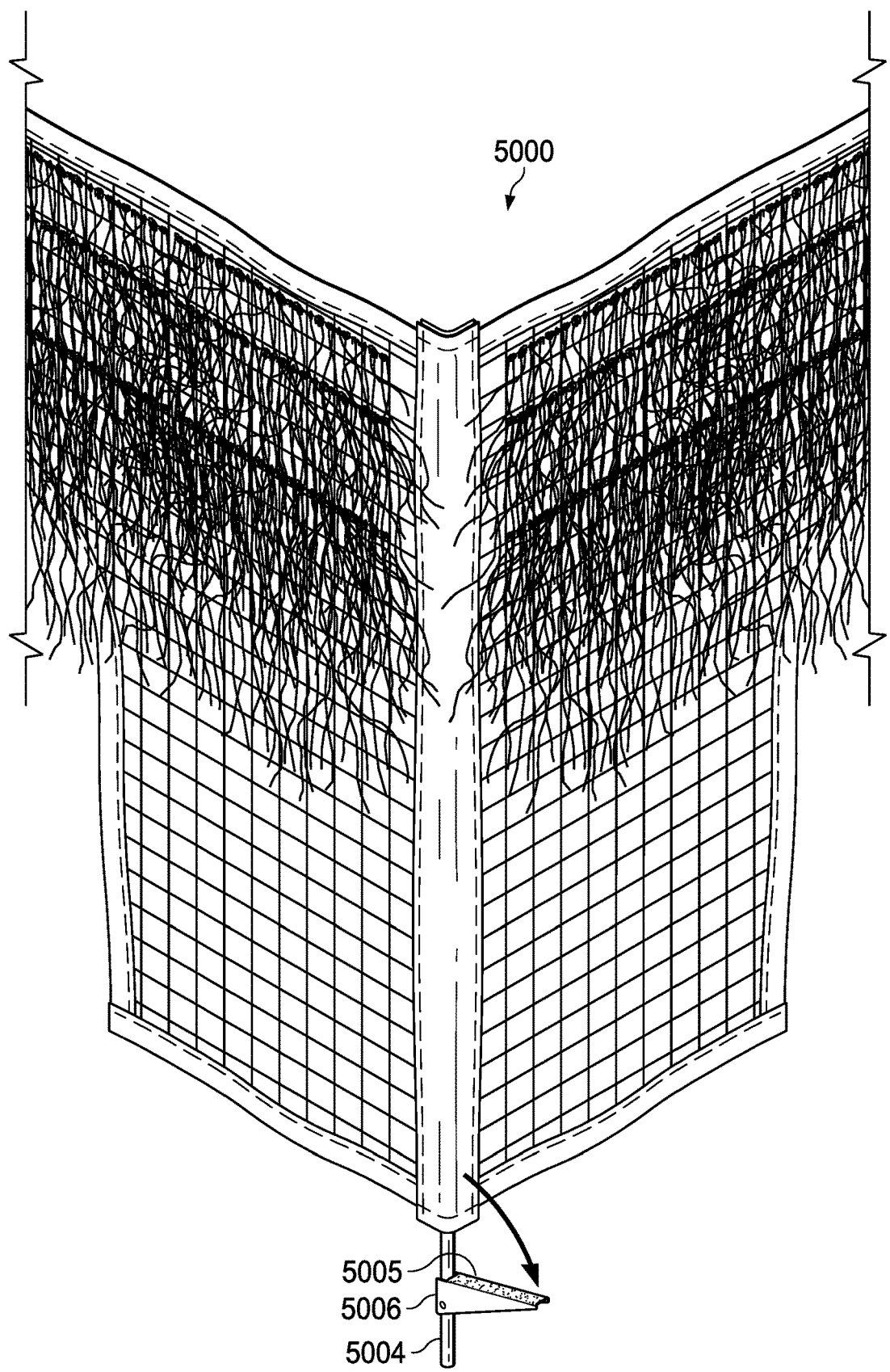
FIG. 5 is a partial front view of an alternate embodiment of the portable ground blind having a rotatable peg attached to a lower portion of a support pole for facilitating the insertion of said pole into the ground.

Referring now to FIG. 5, a partial front view of an alternate embodiment of the portable ground blind having a rotatable peg (5005) attached to a lower portion of a support pole (5004) for facilitating the insertion of said pole into the ground is shown. The rotatable peg (5005) comprises an upper horizontal flat surface on which a user may step to facilitate insertion of the pole into the ground. The peg may assist a user in deploying the portable ground blind into dryer or more compact ground that might otherwise lead the user to having difficulty in carrying out such deployment. The upper surface of the peg preferably has formed on it, or applied on it, a grip enhancing texture. For example, a grit adhesive-backed material shaped to fit on the upper surface of the peg, may be place on such upper surface to provide for a better grip on a user's footwear to decrease the chances of slipping when a user is stepping on the peg during insertion of a pole. The peg is configured to rotate approximately ninety degrees about a pin (5006) which provides the attachment point to the pole, allowing the peg to lie substantially parallel to the pole when the portable ground blind is not deployed, but can be positioned horizontally when needed to insert a pole into the ground. A locking mechanism (not shown) may be utilized in connection with the rotatable peg to allow the peg to be temporarily locked into a substantially horizontal position during blind deployment, and then unlocked to allow the peg to be oriented in parallel with the pole when not the blind is not deployed. In some alternate embodiments, the peg is not rotatable, but is static and remains in a horizontal position. It is contemplated that pegs may be positioned on poles at various distances from the bottom end of the poles than what appears in the drawings depicted herein.

Figure 6:
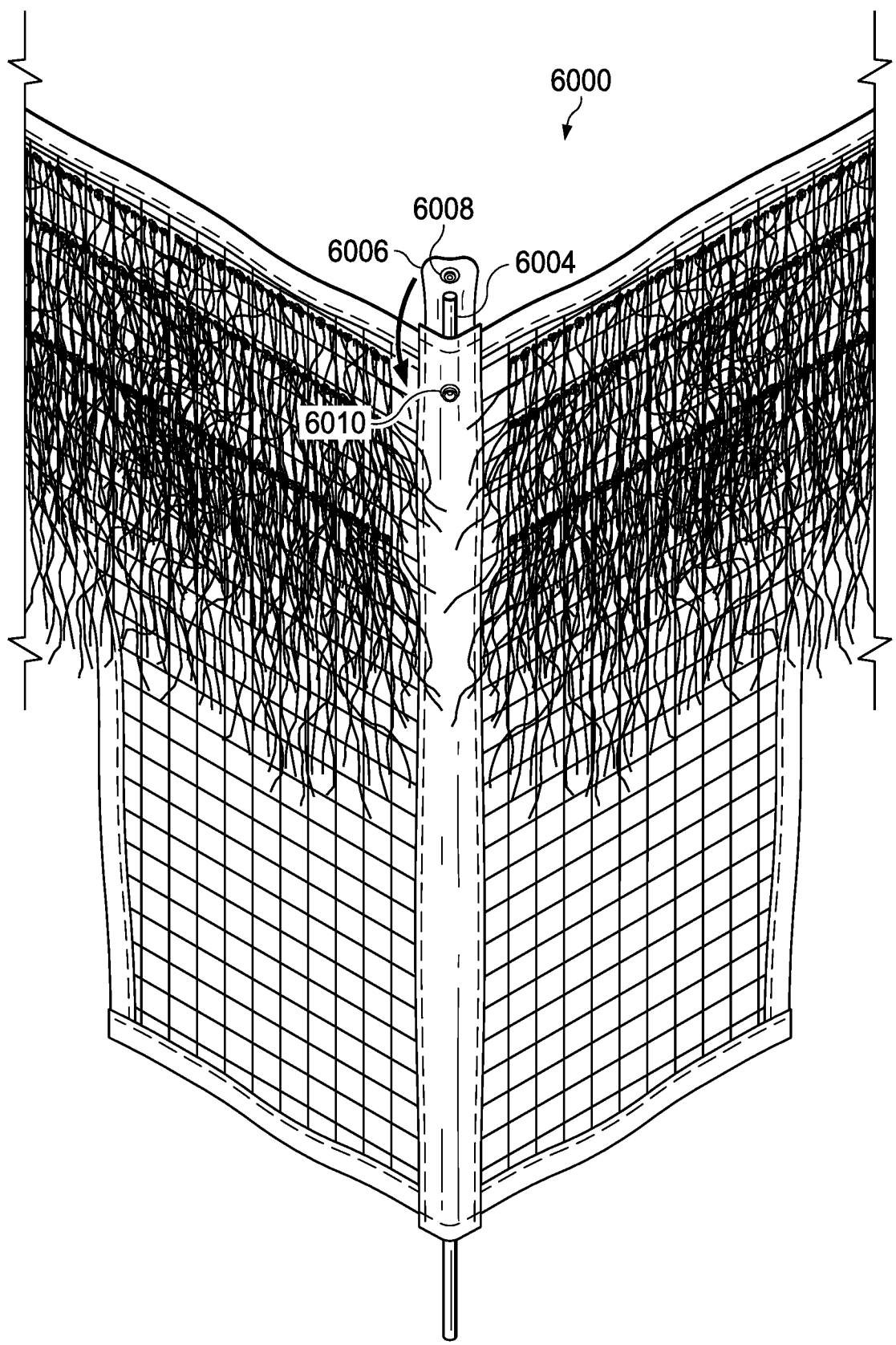
FIG. 6 is a partial front view of an alternate embodiment of the portable ground blind having a removable flap for making the top of a support pole accessible by a user.

Referring now to FIG. 6, a partial front view of an alternate embodiment of the portable ground blind (6000) having a sleeve flap (6006) for making the top of a support pole (6004) accessible by a user is shown. Instead of a sleeve having a closed upper end as previously depicted herein, in the alternate embodiment of the portable ground blind shown in FIG. 6, the upper end of the sleeve includes a flap (6006) that can be opened and closed to expose or cover the top end of the pole (6004). This flap feature provides another advantage over prior art ground blinds in that it provides a user with the ability to strike or otherwise manipulate the top of the pole during insertion or removal of the pole into (or out of) the ground without causing damage to the sleeve material. For example, in one scenario, a user may open the flap and use a mallet to strike the top of the pole in order to drive the pole into the ground and when finished, close the flap such the sleeve supports the ground blind on the pole. In one embodiment, button snaps (6008, 6010) may be placed on the sleeve flap and sleeve to allow the flap to be secured to the sleeve when the flap is in a closed position. In other alternate embodiments, other closure mechanisms may be used that may provide for more noise suppression such as, for example, magnetic fasteners and unidirectional hook and loop fasteners.

Figure 7:
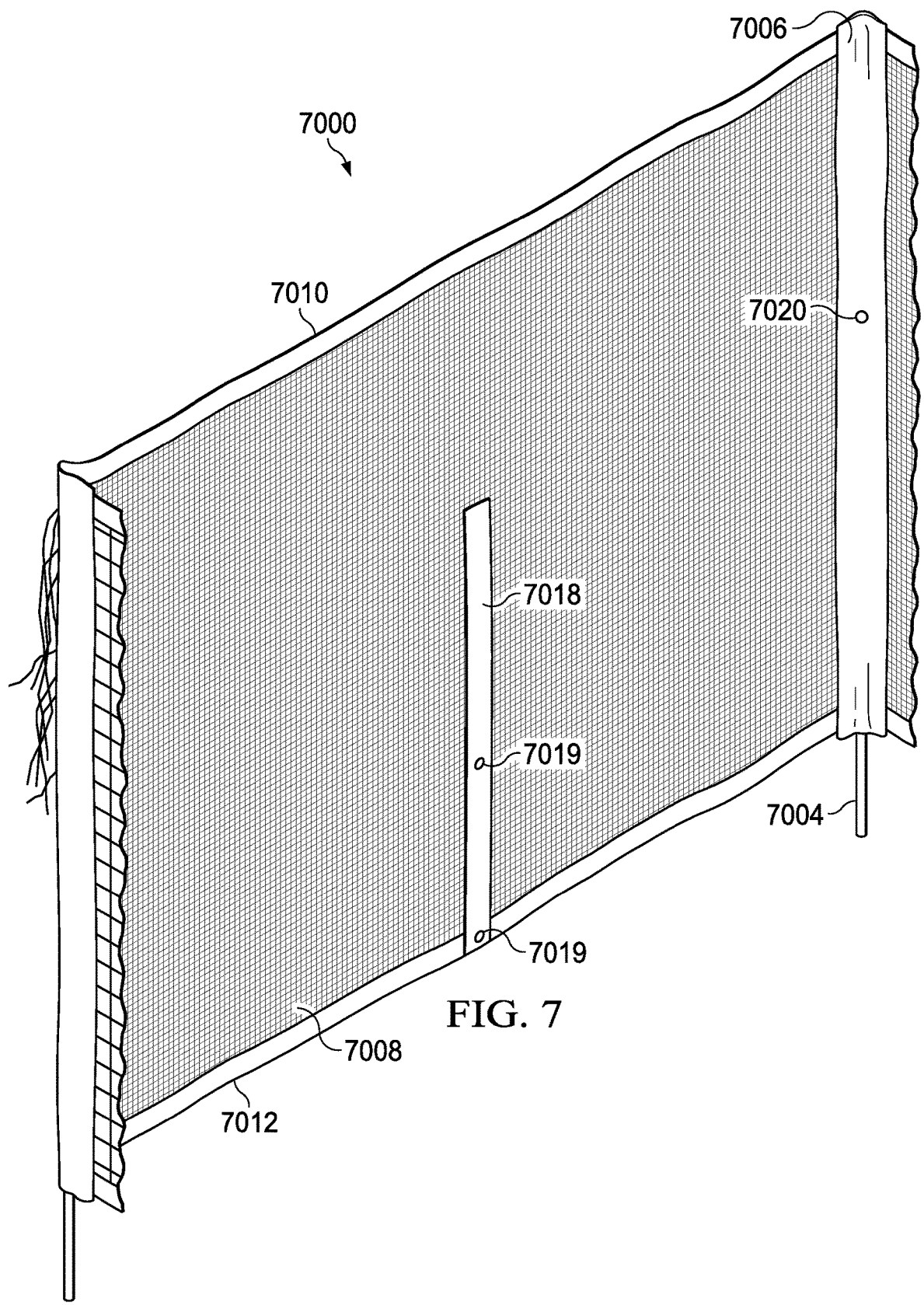
FIG. 7 is a partial rear view of an alternate embodiment of the portable ground blind having a securable panel opening depicted in a closed position.
Figure 8:
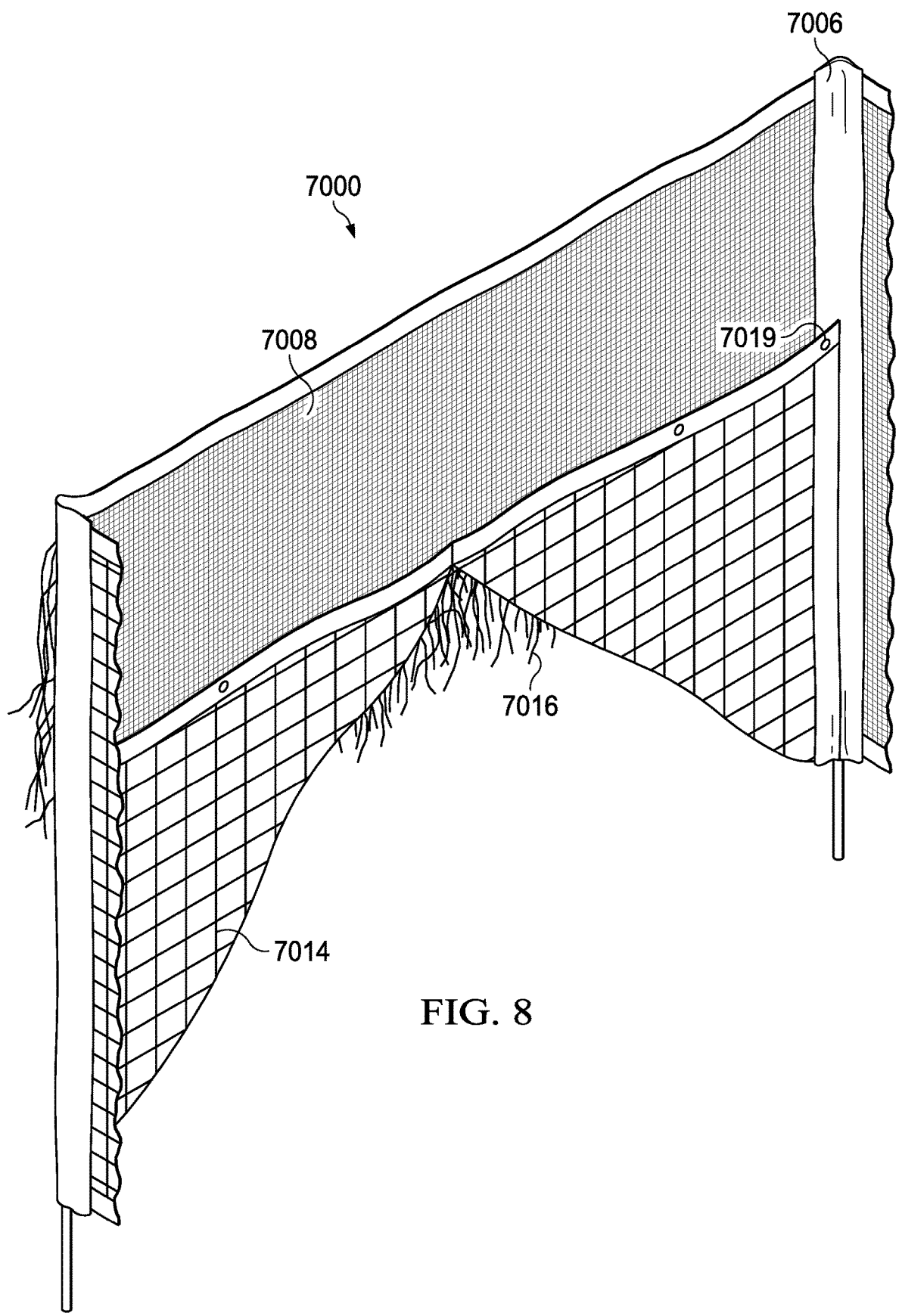
FIG. 8 is a partial rear view of the alternate embodiment of the portable ground blind having a securable opening as shown in FIG. 7, here depicted in an open position.

Referring now to FIG. 7, a partial rear view of an alternate embodiment of the portable ground blind (7000) having a securable panel opening (7018) depicted in a closed position is shown. In the alternate embodiment of the portable ground blind (7000) illustrated in FIG. 7 (partial view of ground blind), a vertical slit is formed on the bottom side of the mesh structure through both the outer and inner meshes, the edges of such slit being lined with a ballistics nylon (or other material) to join the inner and outer mesh structures and to prevent fraying of the meshes. One or more first fastener components (7019) are formed on the slip lining or on the mesh structure adjacent to the slit, which correspond to second fastener components (7020) attached to the inner surface of the sleeve (although not shown, a fastener component is also located on the opposite sleeve). As depicted in FIG. 8, the bottom portions of the mesh structure may be lifted by the user and secured, via the fasteners on the slit liner and on the sleeves, on the sleeves, thereby created a panel opening. In this manner, a panel opening may be formed by a user only when desired by the user, and otherwise left closed if not needed. In one embodiment, fastener components may include button snaps (7019, 7020) that are attached to the mesh structure or slit lining and sleeve to allow the opening flaps to be secured to the sleeve when a panel opening is desired by the user. In other alternate embodiments, other fastener mechanisms may be used that may provide for more noise suppression such as, for example, magnetic fasteners, hooks, string, and unidirectional hook and loop fasteners. In even further alternate embodiments, the slit may be opened and closed via a zipper attached and running along the liner adjacent to the slit opening, with other types of fasteners (buttons, magnets, hook and loop fasteners, string, hooks) used to hold the flaps in an open position. Rather than placing a fastener component on the sleeve, in other alternate embodiments, fastener components may be placed on other parts of the portable ground blind such as on the mesh structures or on liners.

Referring now to FIG. 8, a partial rear view of the alternate embodiment of the portable ground blind having a securable opening as shown in FIG. 7, here depicted in an open position is shown. When a panel opening is desired, a user may lift the flaps created by the slit in the mesh structures and use the fastener components (7019) on the slit liner and sleeve to secure the flaps in an open position as shown in FIG. 8. Ghillie threads (7016) and other concealment enhancement objects may be attached to the outer low-density mesh webbing (7014) to better conceal the user.

Figure 9A:
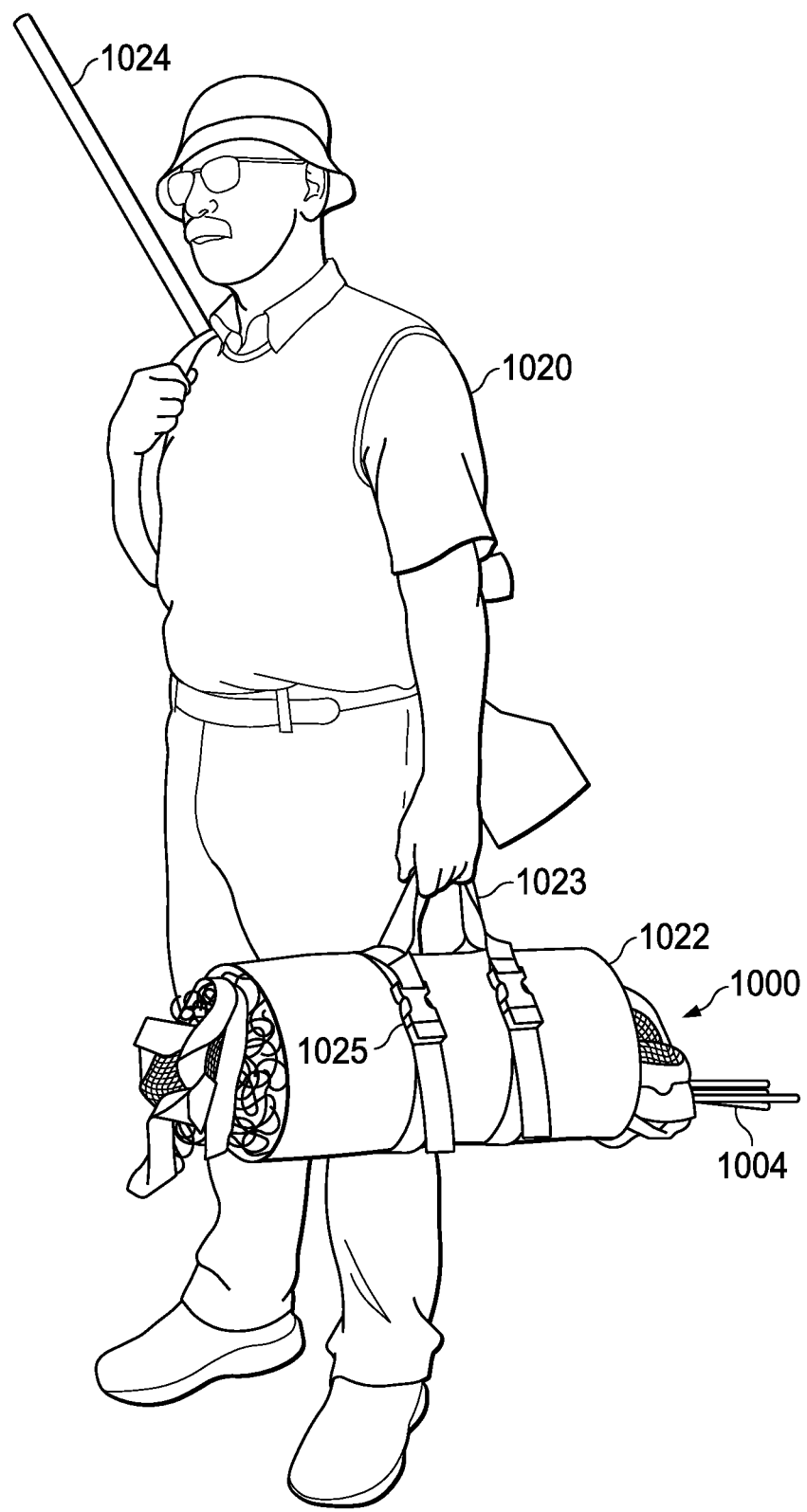
FIG. 9A is a perspective view of a user holding an embodiment of a portable ground blind transportation and deployment system.

Referring now to FIG. 9A, a perspective view of a user (1020) holding an embodiment of a portable ground blind transportation and deployment system is shown. In one embodiment, the portable ground blind transportation and deployment system may comprise a portable ground blind (1000) of the type discussed herein, at least temporarily contained within a shooting mat (1022) configured for the transportation and deployment of such portable ground blind. In one embodiment, a shooting mat (1022) having an elongate body may include an inner surface on which a user lays in a prone or sitting position, and an outer surface on which a handle (1023) and compression straps with buckles (1025) are attached. A portable ground blind may be rolled into a compact form, and the shooting mat wrapped around it and secured by the straps and compression buckles (1025).

The handle of the outer surface of the shooting mat may facilitate the transportation of the portable ground blind by a user. In one embodiment, the shooting mat is constructed of a 1000 denier nylon fabric, although it is contemplated that other materials may be utilized to construct alternate embodiments of the shooting mat.

Figure 9B:
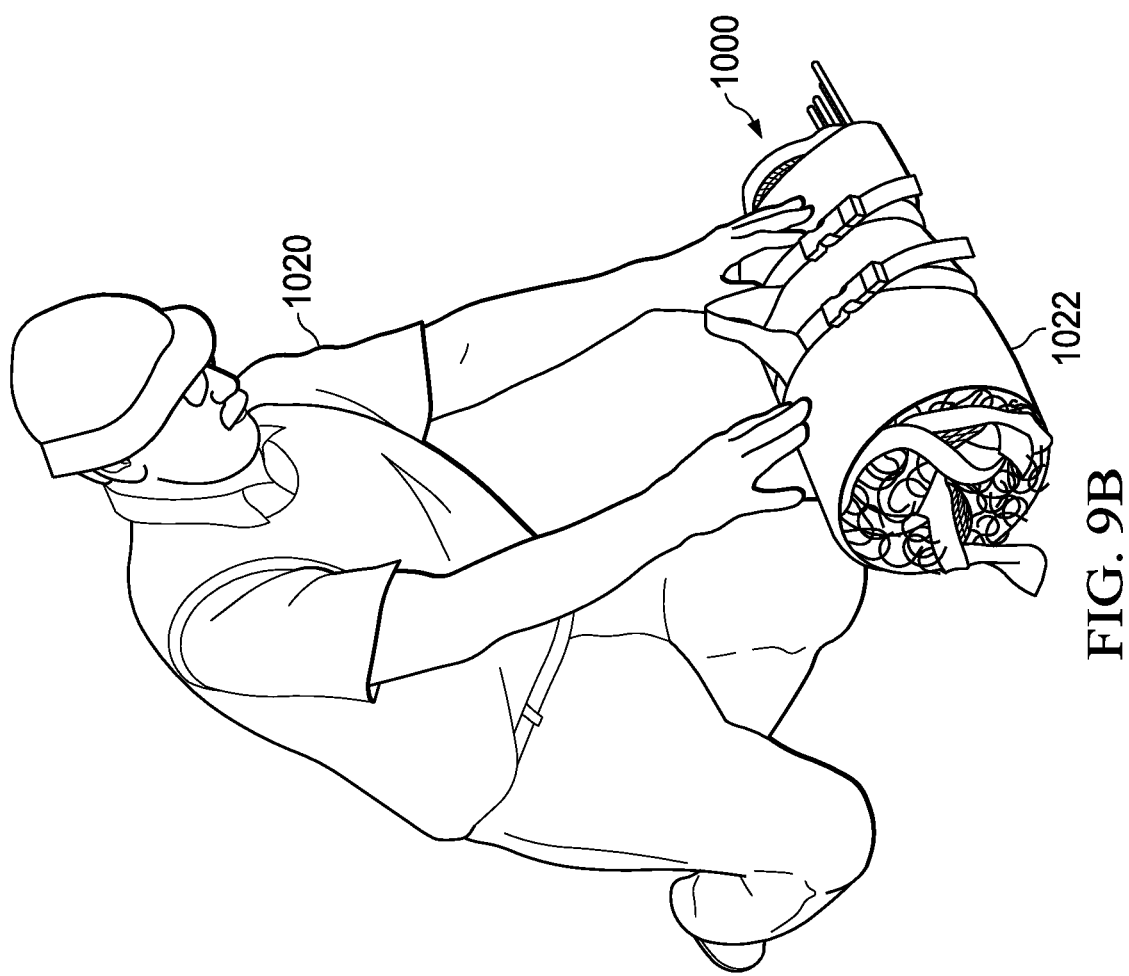
FIG. 9B is a perspective view of a user preparing to deploy the embodiment of the portable ground blind transportation and deployment system as depicted in FIG. 9A.
Figure 9C:
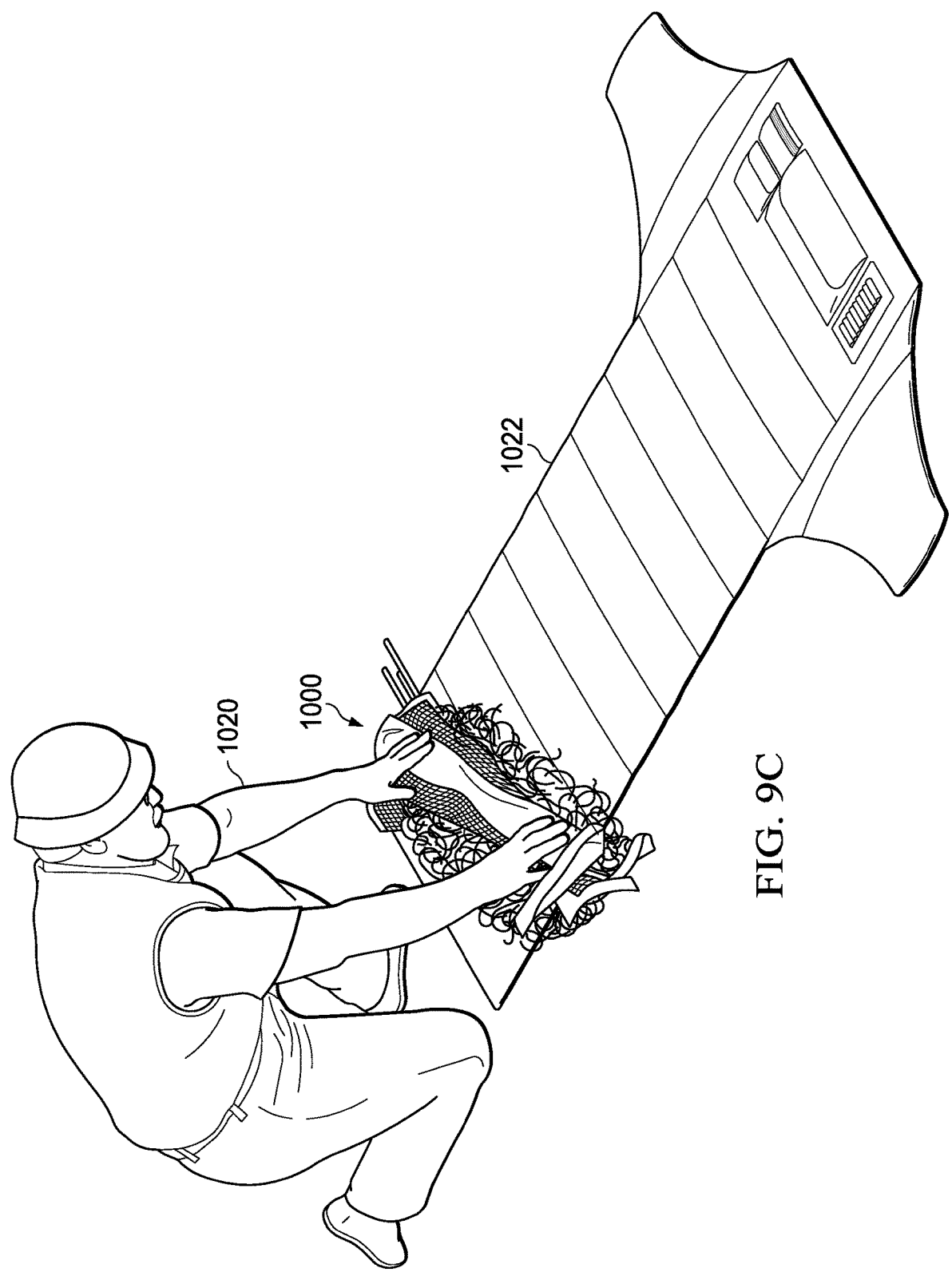
FIG. 9C is a perspective view of a user deploying the embodiment of the portable ground blind transportation and deployment system as depicted in FIG. 9A.
Figure 9D:
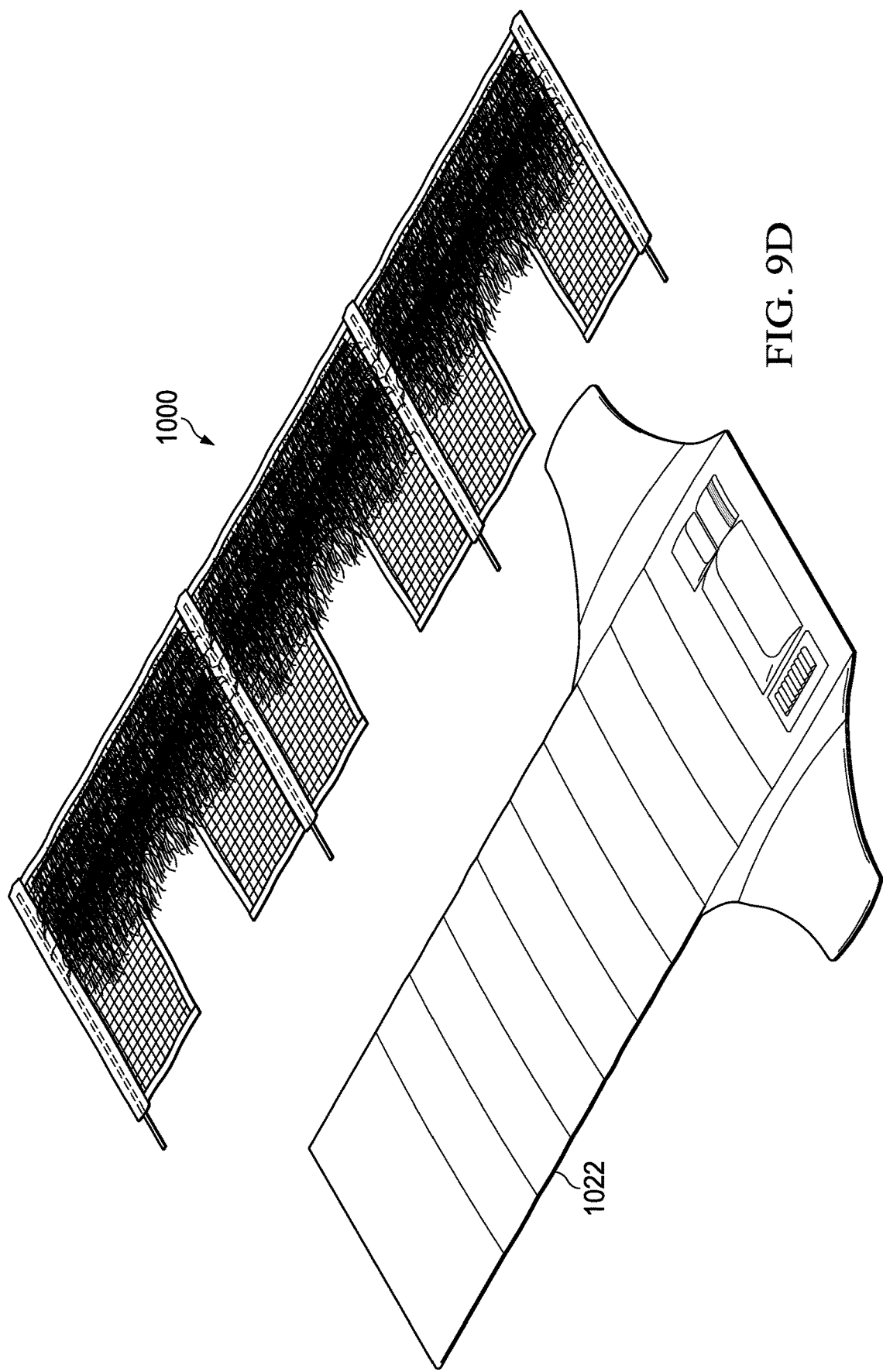
FIG. 9D is a perspective view of an embodiment of a portable ground blind and an embodiment of a shooting mat that are components of the embodiment of the portable ground blind transportation and deployment system as depicted in FIG. 9A.
Figure 9E:
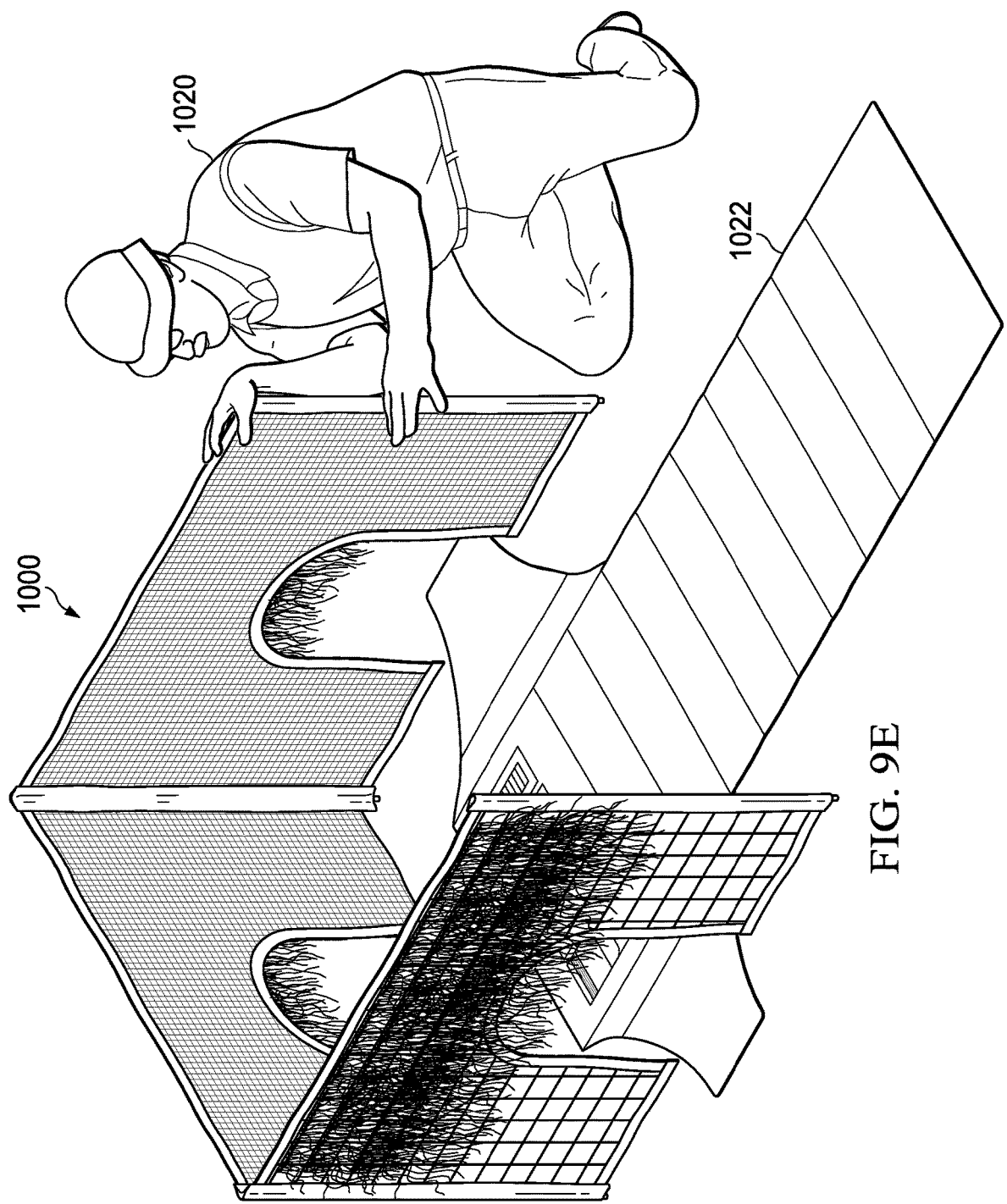
FIG. 9E is a perspective view of a user having deployed the embodiment of the portable ground blind transportation and deployment system as depicted in FIG. 9A.

Referring now to FIG. 9B, a perspective view of a user (1020) preparing to deploy the embodiment of the portable ground blind transportation and deployment system as depicted in FIG. 9A is shown. When a user has found a suitable location for deployment of the portable ground blind, the user may lay the portable ground blind transportation and deployment system on the ground with the shooting mat oriented in such a way that the user knows how the portable ground blind and shooting may will be oriented when deployed. Referring now to FIG. 9C, a perspective view of a user deploying the embodiment of the portable ground blind transportation and deployment system as depicted in FIG. 9A is shown. The user (1020) next opens the buckles, allowing the shooting mat (1022) to be unrolled and also allowing the portable ground blind (1000) to be accessed. Referring now to FIG. 9D, a perspective view of an embodiment of a portable ground blind and an embodiment of a shooting mat that are components of the embodiment of the portable ground blind transportation and deployment system as depicted in FIG. 9A is shown. The portable ground blind (1000) may now be unfurled by the user in preparation for insertion of the portable ground blind. The shooting mat may also be oriented by the user into a desired position and direction. Referring now to FIG. 9E, a perspective view of a user (1020) having deployed the embodiment of the portable ground blind transportation and deployment system as depicted in FIG. 9A is shown. The portable ground blind is deployed by inserting the poles into the ground such that the poles support the portable ground blind in a substantially vertical position. The user may adjust the position of the shooting mat and/or ground blind such that they are in a desired position with respect to one another. In one embodiment of the shooting mat, outwardly extending flaps are attached on the left and right sides of the elongate body of the shooting mat, which are sized to extend into the panel openings. The shooting map flaps provide a user with protection from the ground when utilizing the various panel openings. It is contemplated that in alternate embodiments of the portable ground blind transportation and deployment system, shooting mats having flaps of various orientations and numbers of flaps will be utilized to correspond to variances in the locations and numbers of panel openings utilized in alternate embodiments of the portable ground blind.

The inventions may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes that come within the meaning and range of equivalency of the claims are embraced therein.

I claim:

1. A portable ground blind comprising:
   a plurality of connected blind panels each having a mesh structure having a top side, a bottom side, and lateral sides, each of said lateral sides of said mesh structure attached to one of a plurality of hollow sleeves;
   a plurality of poles, an upper portion of each of said plurality of poles being enclosed within one of said plurality of hollow sleeves, a bottom portion of each of said plurality of poles protruding from a bottom end of the respective hollow sleeve in which it is enclosed; and
   an opening formed on the bottom side of said mesh structure of at least one of said blind panels,
   wherein said mesh structure comprises an inner mesh webbing and an outer mesh webbing.

2. The portable ground blind of claim 1, wherein the said inner mesh webbing has mesh openings that are smaller in size than the mesh openings of the outer mesh webbing.

3. The portable ground blind of claim 1, further comprising a plurality of threads attached to the outer mesh webbing.

4. The portable ground blind of claim 1, wherein a flap is attached to a top end of each of said plurality of hollow sleeves.

5. The portable ground blind of claim 1, wherein a peg is attached to the bottom portion of one or more of said plurality of poles.

6. The portable ground blind of claim 1, wherein said opening is formed by a slit in the bottom side of said mesh structure.

7. The portable ground blind of claim 6, wherein a first fastener component is attached to the mesh structure adjacent to the slit, and a second fastener component is attached to an adjacent hollow sleeve.

8. The portable ground blind of claim 1, wherein each of said plurality of poles is collapsible.

9. A portable ground blind comprising:
   a plurality of connected blind panels each having a mesh structure having a top side, a bottom side, and lateral sides, each of said lateral sides of said mesh structure attached to one of a plurality of hollow sleeves;
   a plurality of poles, an upper portion of each of said plurality of poles being enclosed within one of said plurality of hollow sleeves, a bottom portion of each of said plurality of poles protruding from a bottom end of the respective hollow sleeve in which it is enclosed; and
   an opening formed on the bottom side of said mesh structure of at least one of said blind panels, wherein said opening is shaped such that said bottom side of said mesh structure is not linear.

10. A portable ground blind transportation and deployment system comprising:
   a portable ground blind comprising a plurality of connected blind panels each having a mesh structure having a top side, a bottom side, and lateral sides, each of said lateral sides of said mesh structure attached to one of a plurality of hollow sleeves; a plurality of poles, an upper portion of each of said plurality of poles being enclosed within one of said plurality of hollow sleeves, a bottom portion of each of said plurality of poles protruding from a bottom end of the respective hollow sleeve in which it is enclosed; an opening formed on the bottom side of said mesh structure of at least one of said blind panels; and
   a shooting mat having an elongate body with an inner surface and an outer surface, said shooting mat have straps attached to said outer surface;
   wherein said shooting mat is configured to at least partially enclose said portable ground blind when said portable ground blind has been rolled up,
   wherein said mesh structure of at least one of said plurality of connected blind panels comprises an inner mesh webbing and an outer mesh webbing.

11. Said portable ground blind transportation and deployment system of claim 10, wherein a handle is attached to said outer surface of said shooting mat.

12. Said portable ground blind transportation and deployment system of claim 10, wherein said shooting mat comprises a plurality of outwardly extending flaps attached to said elongate body of said shooting mat.

\* \* \* \* \*